UNITED STATES PATENT OFFICE.

MARSHALL TURLEY AND GEORGE W. CHAMBERLIN, OF COUNCIL BLUFFS, IOWA.

PLASTER.

SPECIFICATION forming part of Letters Patent No. 416,278, dated December 3, 1889.

Application filed October 30, 1888. Serial No. 289,541. (No specimens.)

*To all whom it may concern:*

Be it known that we, MARSHALL TURLEY and GEORGE W. CHAMBERLIN, residents of Council Bluffs, in the county of Pottawattamie and State of Iowa, have invented certain new and useful Improvements in Plaster; and we do hereby declare the following to be a full, clear, and exact description of the invention, such as will enable others skilled in the art to which it appertains to make and use the same.

Our invention relates to an improvement in plaster compositions for walls and other purposes.

In plastering it is customary to apply three coats, viz: the first coat, which is a compound of sand, lime, and hair mixed in proper proportions; the second composed of lime and sand, and the third coat composed of lime and plaster-of-paris. The lime is used to bond the sand, and the hair to cause it to hang together. There is no adhesive nor cohesive power to quick or caustic lime when dry and unmixed with anything else, and in mortars it kills the strength of the hair in time, and the clinches give way and the plaster falls off.

It is the object of our present invention to obviate these objectionable features of plaster as formerly made and to provide an improved plaster which will effectually fill the office for which it is intended without liability of cracking or peeling off.

With these ends in view the invention consists in a compound comprising carbonate of lime, body or stiffening material, and oil mixed with water in sufficient quantity to insure proper consistency.

In some instances it might be found advantageous to add powdered oil-cake, flour, or shorts.

The ingredients will preferably be mixed in about the following proportions: sand, eight parts, more or less; carbonate of lime, one part, more or less; oil-cake, (when used,) one part, more or less; flour, (when used,) one-half part, more or less; oil, one-fourth part, more or less. When the flour and oil-cake are omitted, the proportions of the other ingredients will be varied accordingly, to insure proper consistency. If desired, hair or glue may be added.

The difference between caustic or quick lime and carbonate of lime is as follows: Limestone rock is carbonate of lime in its natural form. Caustic or quick lime is prepared by heat and the carbonic acid is driven off, and its chemical state differs widely from the limestone. When quick or caustic lime alone is dried, it is friable and invariably cracks and curls up, and possesses no adhesive power and but little cohesive strength. The pulverized carbonate of lime, on the contrary, when wet and made into a paste and spread on a surface, will dry smooth and strong and free from cracks, and will not curl up at the edges when drying.

The quality of our ingredients are such that the oil dries and gives firmness and durability and makes the plaster impervious to water. The oil-cake gives viscidness and toughness and dries, binding all the parts firmly together. The carbonate of lime fills the interstices between the different particles of the sand and makes it work easily under the tools. Carbonate of lime is limestone, marble, or chalk, as in the quarry. These several articles we take from the quarry, and with machinery pulverize fine, and so prepared they differ essentially from caustic or quick lime.

The costs are no greater than by the old process, and we make a firmer wall, free from cracking, much smoother, harder, and more durable, requiring less labor and time to prepare the mortar for use, and requiring fewer hands to attend the masons.

We can by machinery reduce carbonate of lime to powder or dust cheaper than the carbonate of lime can be reduced to caustic or quick lime by heat. We add sufficient water in preparing the compound to render the mortar of proper consistence.

Plaster-of-paris is preferably added to the above compound to produce a finishing coat.

Having fully described our invention, what we claim as new, and desire to secure by Letters Patent, is—

The herein-described composition of matter for plastering, consisting of sand, carbonate of lime, and oil combined in suitable proportions with water.

In testimony whereof we have signed this specification in the presence of two subscribing witnesses.

MARSHALL TURLEY.
GEORGE W. CHAMBERLIN.

Witnesses:
W. S. MAYNE,
A. S. HAZELTON.